Jan. 7, 1941.   G. C. MAYFIELD   2,227,888
PISTON EXPANDER
Filed Jan. 6, 1940
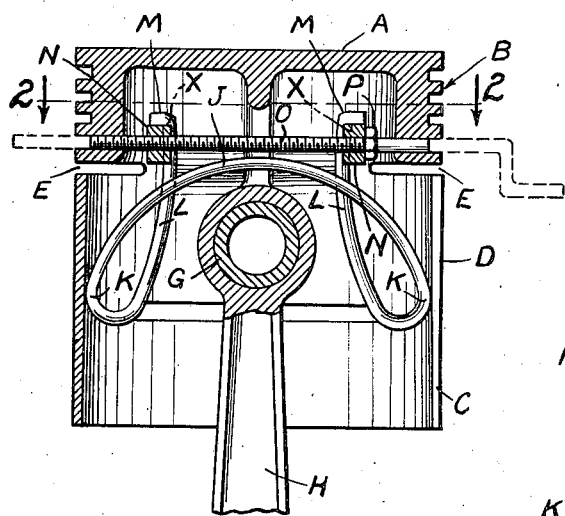
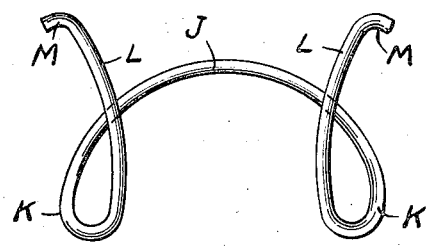
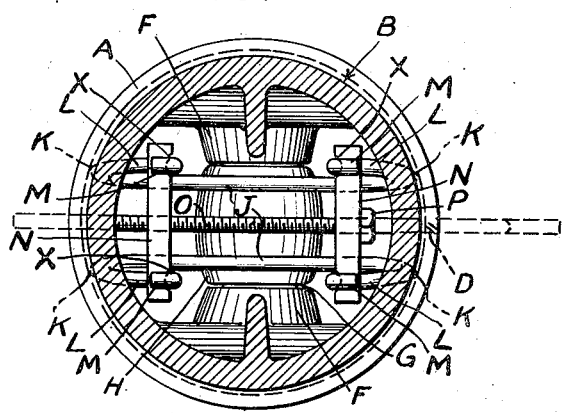
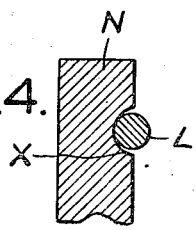
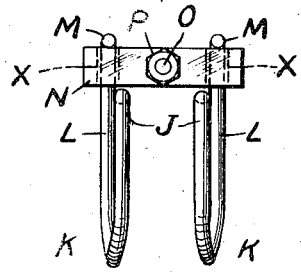
INVENTOR;
GEORGE C. MAYFIELD
BY *Henry Kinealy*
ATTORNEY Patented Jan. 7, 1941

2,227,888

UNITED STATES PATENT OFFICE 2,227,888

PISTON EXPANDER

George C. Mayfield, Richmond Heights, Mo., assignor to McQuay-Norris Manufacturing Company, St. Louis, Mo., a corporation of Delaware Application January 6, 1940, Serial No. 312,763

6 Claims. (Cl. 309—12)

My invention relates to piston expanders and more particularly to piston expanders of the type wherein the expander may be adjusted to change or control the expansive force exerted to increase the diameter of the piston.

Heretofore, expanders of this type have been made so that, although the parts engaging the piston have been resilient, the adjustability of the expanders depended directly upon the force obtained by regulation of the adjusting means. That is to say, if the expander comprised two legs movable relative to one another the expansive force against the skirt would be increased directly in proportion to the force exerted to separate these legs. In some cases it is desirable that such expansive force be greater than resulting from direct separation of the legs or from adjustment of other parts, so that a firm and adequate force may be created properly to separate the piston skirt.

The objects of this invention are to provide a spring expander wherein variations in the expansive force created by the expander are obtained by adjustment of a spring part and to provide an expander which will be cheap to manufacture and easy to install.

The broad concept of my invention contemplates its embodiment in various types of expanders which expanders may be mounted in and supported by the piston in different ways. However, in the accompanying drawing I have shown a simple embodiment of my invention. In the drawing wherein similar characters are used to designate similar parts, Fig. 1 is a section of a piston including an expander made according to my invention; Fig. 2 is a cross section along the lines 2—2 in Fig. 1; Fig. 3 is a view of the expander when not mounted in a piston; Fig. 4 is a detailed view of some of the parts; and Figs. 5 and 6 show the expander and adjusting means therefor.

The piston, as shown in the figures and in which my expander is mounted, includes a head A containing the usual ring belt B and having a resilient skirt C depending therefrom. The skirt C is split axially as at D and is separated from the head throughout most of the circumference of the piston by circumferentially extending slots E. The piston also has bosses F through which extend a wrist pin G carrying a connecting rod H.

In this embodiment of my invention the expander comprises a pair of identical parts formed of spring wire and each arranged to extend across the interior of the piston skirt and to engage the skirt at substantially diametrically opposed points, preferably, removed about ninety degrees from the pin bosses F. Each part of the expander consists of a generally U-shaped spring loop J having each of the end portions K thereof adapted to engage the inner surface of the piston skirt and then bent inwardly and upwardly to form spring arms L. Preferably, the portions K which join the integral loop J and the arms L are arranged as shown but the shape of the parts, obviously, may be changed. It will be evident that if the arms L are caused to be brought closer together an uncoiling action will be exerted in the expander to increase the distance between the ends K of the loop and to exert a greater outward expansive force on the piston skirt.

The means for adjusting the position of the arms L may take any one of a number of forms, but in the embodiment shown, the upper ends of each of the arms on both of the parts are arranged to engage one of the pair of bars N. The end of each arm L may be bent over to form a hook M whereby the engagement with a bar N will be maintained. The pair of bars N in turn are caused to move away from or towards one another by a shaft O extending across the hollow interior of the piston and, preferably, extending through openings formed in the bottom of the lower ring groove of the ring belt D. One of the bars N is threaded onto the shaft O and the other is engaged by a nut P whereby when the shaft is rotated in the proper direction the bars N will be caused to move towards one another and, in turn, to move the arms L to increase the expansive force exerted by the expander in the manner described above.

The engagement of the arms L and the bars N may be effected in any way but I have found that best operation of the expander will be obtained if a free rolling or floating engagement is had between the arms and the bars. To this end in the embodiment shown here each bar N is provided with a rounded or semi-circular notch X, as shown in Fig. 4, to receive an arm L and preferably the notch is larger than the section of the arm L which it receives. In other words, as in the embodiment shown, the radius of the notch X is greater than the radius of the cross section of an arm L. In this manner, and particularly if the hooks M are provided, an adequate but free engagement will be maintained between the arms L and the bars N to maintain the expander in place and movement of the expander such as caused by flutter of the piston skirt will not be transmitted to the bars N and to the adjusting means for the expander as would be the case if a rigid engagement was maintained between the bars and the arms or if the arms were fixed to the bars.

When an expander embodying my invention is to be used in a piston the spring parts are slid upwardly into place from the open bottom of the piston and the upper ends M of the arms L are hooked over the bars N which have been previously mounted in place on the shaft O. The shaft is then rotated to bring the bars N closer together to an extent to obtain the desired expansive force. Then the ends of the shaft O are cut off flush with the bottom of the ring groove. If desired, in the embodiment shown, the loops J of the two parts of the expander may be connected.

As stated above, I have shown herein one embodiment only of my invention, but many other embodiments may be made wherein flat spring metal is substituted for the spring wire shown and wherein the spring of the expander may be obtained in other ways without departing from the spirit of my invention as included in the appended claims.

What I claim as new and desire to secure by Letters Patent is:

1. A piston expander comprising a U-shaped resilient portion having the ends thereof adapted to engage the inner surface of a piston skirt, spring means for causing said U-shaped portions to exert an outward expansive force against said skirt, and means for adjusting said spring means whereby said expansive force may be regulated and controlled.

2. A piston expander comprising a U-shaped resilient portion having the ends thereof adapted to engage a piston skirt, and each of said ends being bent inwardly and upwardly to form springs, and means whereby said ends may be moved relative to one another to adjust the expansive force created by said expander.

3. A piston expander comprising a U-shaped resilient portion having the ends thereof adapted to engage a piston skirt, and each of said ends being bent inwardly and upwardly to form spring arms, a pair of bars arranged so that each of said bars engages one of said arms and means whereby said bars may be moved relative to one another to adjust the expansive force created by said expander.

4. A piston expander comprising a U-shaped resilient portion having the ends thereof adapted to engage a piston skirt, and each of said ends being bent inwardly and upwardly to form spring arms, a pair of bars arranged so that each of said bars has a free engagement with one of said arms and means whereby said bars may be moved relative to one another to adjust the expansive force created by said expander.

5. A piston expander comprising a U-shaped resilient portion formed of spring wire and having the ends thereof adapted to engage a piston skirt, and each of said ends being bent inwardly and upwardly to form spring arms, a pair of bars arranged so that each of said bars engages one of said arms, and each of said bars having a rounded notch formed therein of greater radius than the cross section of said arm whereby said expander will have a free engagement with said bars, and means whereby said bars may be moved relative to one another to adjust the expansive force created by said expander.

6. A piston expander comprising a U-shaped resilient portion having the ends thereof adapted to engage the inner surface of a piston skirt, spring means for causing said U-shaped portions to exert an outwardly expansive force against said skirt and formed integrally with said U-shaped portions, and means for adjusting said spring means whereby said expansive force may be regulated and controlled.

GEORGE C. MAYFIELD.